(12) United States Patent
Hansen et al.

(10) Patent No.: US 9,386,277 B2
(45) Date of Patent: Jul. 5, 2016

(54) GENERATING A VIDEO PANE LAYOUT

(71) Applicant: Cisco Technology, Inc., San Jose, CA (US)

(72) Inventors: Robert Hansen, Slough (GB); Malcolm Walters, Abingdon (GB); Espen Berger, Oslo (NO); Jarl Staurnes, Fjellhamar (NO)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 14/134,559

(22) Filed: Dec. 19, 2013

(65) Prior Publication Data

US 2015/0002610 A1    Jan. 1, 2015

Related U.S. Application Data

(60) Provisional application No. 61/840,294, filed on Jun. 27, 2013.

(51) Int. Cl.
*H04N 7/14* (2006.01)
*H04N 7/15* (2006.01)
*H04N 21/2343* (2011.01)

(52) U.S. Cl.
CPC .................. *H04N 7/152* (2013.01); *H04N 7/15* (2013.01); *H04N 21/234363* (2013.01)

(58) Field of Classification Search
CPC ....................................................... H04N 7/14
USPC .......... 348/14.01, 14.03, 14.07, 14.09, 14.08, 348/14.12
See application file for complete search history.

(56) References Cited

U.S. PATENT DOCUMENTS

| | | | | |
|---|---|---|---|---|
| 8,421,840 B2* | 4/2013 | Eleftheriadis | .......... | H04N 7/152 348/14.07 |
| 2007/0206089 A1* | 9/2007 | Eshkoli | .............. | H04L 12/1822 348/14.02 |
| 2008/0100696 A1* | 5/2008 | Schirdewahn | ......... | H04N 7/152 348/14.09 |
| 2008/0136899 A1* | 6/2008 | Eisenberg | .............. | H04N 7/152 348/14.09 |
| 2013/0091290 A1 | 4/2013 | Hirokawa et al. | | |
| 2015/0097915 A1* | 4/2015 | Navon | ................... | H04N 7/152 348/14.1 |

FOREIGN PATENT DOCUMENTS

WO    WO2009152158    12/2009

OTHER PUBLICATIONS

International Search Report cited in PCT/US2014/042664, mailed Oct. 15, 2014.

* cited by examiner

*Primary Examiner* — Olisa Anwah
(74) *Attorney, Agent, or Firm* — Lempia Summerfield Katz LLC

(57) ABSTRACT

A first video conferencing device determines pane sizes of a plurality of video content to be displayed at a second video conferencing device, where the pane sizes are determined based on a minimum video pane size of the second video conferencing device. The first video conferencing device then transmits, to the second video conferencing device, a video stream including at least a subset of the plurality of the video content with the determined pane sizes. The determined pane sizes are equal to or greater than the minimum video pane size.

18 Claims, 6 Drawing Sheets

GENERATING A VIDEO PANE LAYOUT

CROSS-REFERENCE TO RELATED APPLICATION

This application is based upon and claims the benefit of priority from U.S. Provisional Application No. 61/840,294, filed on Jun. 27, 2013, the entire contents of which are incorporated herein by reference.

BACKGROUND

1. Technical Field

This application relates generally to generating a video pane layout in a recipient endpoint of a video teleconference.

2. Discussion of the Related Art

The "background" description provided herein is for the purpose of generally presenting the context of the disclosure. Work described herein, to the extent it is described in this background section, as well as aspects of the description which may not otherwise qualify as prior art at the time of filing, are neither expressly or implicitly admitted as prior art.

A video conferencing system is used to communicate both video and audio between two or more parties, or participants, that are not at a same location. FIG. 8 is a block diagram of a typical video conferencing system. In FIG. 8, endpoints, 82, 84 and 86 are connected to a multipoint control unit (MCU) 88 via a network 80. The network can be either private or public, such as the Internet, and may have wireless and wired components. Each endpoint 82, 84, 86 sends image and sound data of a corresponding participant to the MCU 88, which then processes the sound and video data and sends the results to the endpoints 82, 84, 86. The processing performed by the MCU 88 can include merging the video and audio data into a layout for presentation at each of the endpoints 82, 84, 86.

In the layout received by the endpoints 82, 84, 86, a user can view multiple panes of video, usually corresponding to the other participants in the conference and possibly to a content video stream. The user may view the multiple panes of video on a screen of various sizes, since the endpoints can include a large screen mounted in a video conference room, the screen of a personal computer, or even the screen of a telephone or tablet. Moreover, various screen resolutions are also possible and are not always linked to screen size—some 4-inch phone screens have better resolution than a 60-inch monitor.

BRIEF DESCRIPTION OF THE DRAWINGS

A more complete understanding of the disclosure may be attained by reference to the drawings, in which.

DESCRIPTION OF EXAMPLE EMBODIMENTS

Overview

Figure 1A:
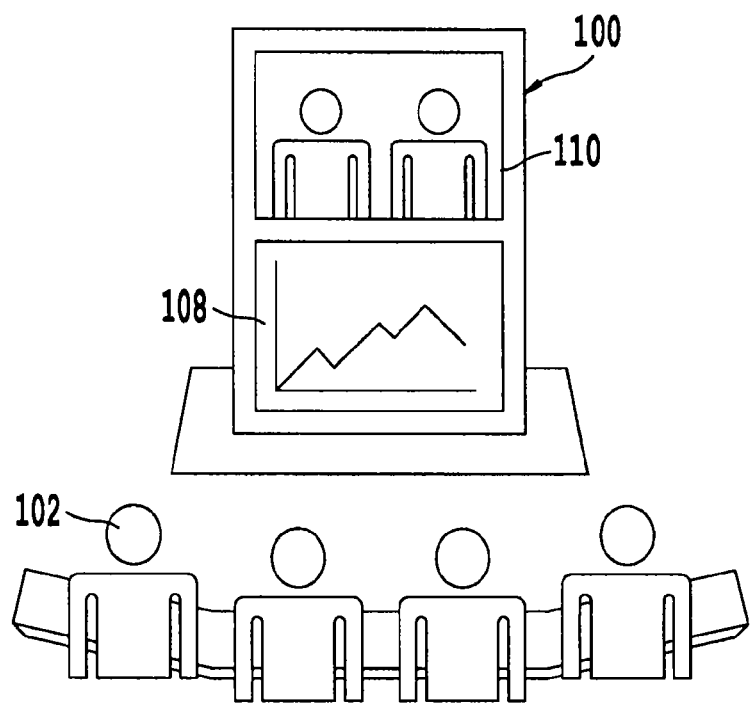
FIGS. 1A-1C shows exemplary video conference endpoint scenarios.

An exemplary method performed by a first video conferencing device includes determining, at the first video conferencing device, pane sizes of a plurality of video content to be displayed at a second video conferencing device, where the pane sizes are determined based on a minimum video pane size of the second video conferencing device. The exemplary method also includes transmitting, from the first video conferencing device to the second video conferencing device, a video stream including at least a subset of the plurality of video content with the determined pane sizes, where the determined pane sizes are equal to or greater than the minimum video pane size.

DETAILED DESCRIPTION

Like reference numerals in the drawings and the description thereof designate identical or corresponding parts/steps throughout the several views. Any processes, descriptions or blocks in flow charts or functional block diagrams should be understood as representing modules, segments, portions of code which include one or more executable instructions for implementing specific logical functions or steps in the processes/algorithms described herein, and alternate implementations are included within the scope of the exemplary implementations of this disclosure in which functions may be executed out of order from that shown or discussed, including substantially concurrently or in reverse order, depending upon the functionality involved.

In the following disclosure, according to an exemplary implementation, the term "sending device" refers to a video conferencing device that sends information, such as an audio-visual stream, to another video conferencing device. The video conferencing device that receives the audio-visual stream is referred to as a "receiving device." However, these terms are used only to aid in the understanding of certain exemplary aspects of the disclosure, and should not be viewed as limiting. A video conferencing device may assume both the role of sending device receiving device during the course of a video conference. The video conferencing device can also be an MCU.

Depending on the size of the screen viewed by a user, there is a video pane size below which a video pane is sub-optimally small. For example, while a 1080p video stream in which an individual participant is shown in a 192×108 pixel sub-pane may be suitable for a 60 inch screen in a conference room where it would appear as approximately 12×9 cm, the user experience for the same stream rendered on a 6 inch display on a desk phone may be significantly worse, with the pane size being too small to be useful at only 1.2×0.9 cm.

Figure 1B:
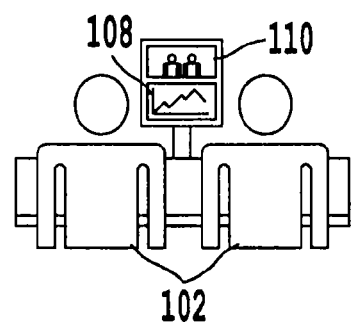
Figure 1C:
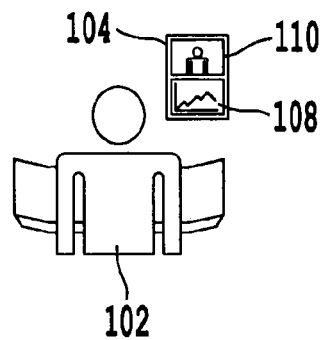

FIGS. 1A-1C illustrate the various exemplary screen sizes that may be used by a participant of a video conferencing system. FIG. 1A shows a video conferencing room in which participants (102) view a large screen (100) showing a video pane (110) of remote participants and a video pane (108) of a content video stream. FIG. 1B shows a video conferencing scenario in which participants (102) view the video panes (108 and 110) on a computer monitor. Finally, FIG. 1C shows a participant (102) viewing the video panes (108 and 110) on a mobile device (104).

Exemplary implementations handle the various exemplary screen sizes in an efficient and responsive manner. Problems including requiring a heavy-weight protocol and signaling overhead, as well as delayed responsiveness to changes to a conference are avoided if receiving devices communicate a minimum size limit of individual panes they are to display. In this case, the sending device can ensure that it never provides unsuitably small video panes to the receiving device, even as the properties of the conference and the input streams change. Should the properties of the conference or the input streams change, the sending device can immediately change the layout provided to the receiving device without any communication with the receiving device, minimizing the delay in changing to the new layout and decreasing signaling overhead between the sending device and the receiving device. Furthermore, according to exemplary implementations, the sending device is not encumbered by an inflexible pane size policy, or by the need to communicate with each receiving device when the makeup of the conference changes dynamically.

Figure 2:
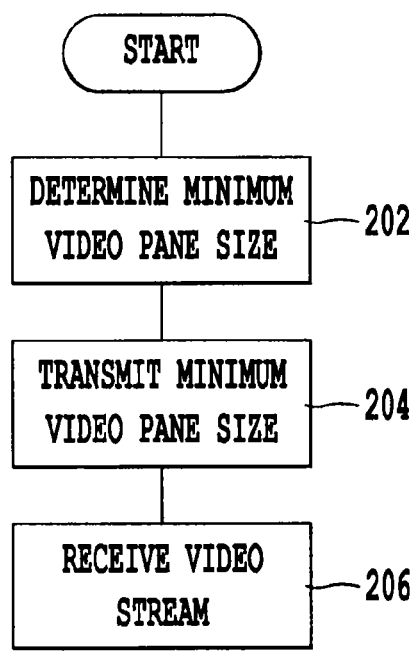
FIG. 2 is a flowchart of an exemplary method performed by a receiving device.

FIG. 2 depicts an exemplary method, by an algorithmic flowchart, performed by a receiving device according to an exemplary implementation. In step 202, the receiving device determines the minimum video pane size that may be optimally displayed thereon. The minimum video pane size can be a minimum for all types of video, or it may impose different limits for different types of video. For example, it may be acceptable to show full motion video of participants in a smaller pane than it would to show slides with text. Furthermore, there could also be different limits for different participants in the conference. For example, different minimum video pane sizes assigned to participants of varying degrees of importance to the conference. Herein, the term "minimum video pane size" encompasses different minimum video pane sizes assigned to different types of video or to different conference participants.

The determination of minimum video pane size can be made by the receiving device or by the sending device. For example, the receiving device may express the physical size of its screen. In this case, the sending device can use hard-coded or user-configurable logic on its end to determine the corresponding acceptable size of encoded video panes for display on a screen of that size. This communication can be included in the call signaling protocol or in any other signaling channel, such as a new media-level conference control protocol. In the case of Session Initiation Protocol (SIP), the screen size can be expressed with a new media attribute for each video m-line, such as "a=screen-size: x=180, y=120," expressing the dimensions in millimeters. In this example, the sending device makes a decision about the minimum pane size based on the physical size of the screen of the receiving device.

Alternatively, the receiving device may transmit the minimum video pane size as a ratio of the overall stream size. In SIP, this could be done with a declarative Session Description Protocol (SDP) attribute for each video m-line, such as "a=min-composed-pane: 0.1, slides 0.4," expressing that no internal pane should be smaller than a tenth of the overall video size on each side, except for panes of slides, which should be no smaller than four tenths. In this example, the receiving device makes the decision about the minimum video pane size.

Once the minimum video pane size has been determined, the receiving device transmits the determined minimum video pane size to the sending device in step 204. The above-described method of transmitting the minimum video pane size is declarative by the receiving device and requires no negotiation between the sending and receiving devices. Finally, after the minimum video pane size is transmitted, the receiving device receives from the sending device a video stream in step 206. The feature of defining the minimum video pane size by the receiving device may be optional, such that, if the sending device does not support this function, then the sending device will provide the receiving device with a composed video stream with no limits to minimum video pane size. Alternatively, the receiving device will receive no video rather than video with overly small panes. In this case, the sending device can include an attribute in SIP confirming that the sending device supports the feature of defining the minimum video pane size by the receiving device. On the other hand, the receiving device can use mechanisms in the signaling (such as the Require field in SIP) to ensure the call fails if the sending device does not support the feature of defining the minimum video pane size by the receiving device.

In another implementation, the minimum video pane size may be included as part of a pre-existing protocol to control the layout received by the receiving device. For example, due to internal limitations such as configured policy, internal encoder architecture, or the need to send the same video stream to multiple receiving devices, the sending device may not be capable of generating a specific layout for each receiving device based on that receiving device's defined minimum video pane size, but may instead provide a range of layouts each receiving device may choose from.

Figure 3:
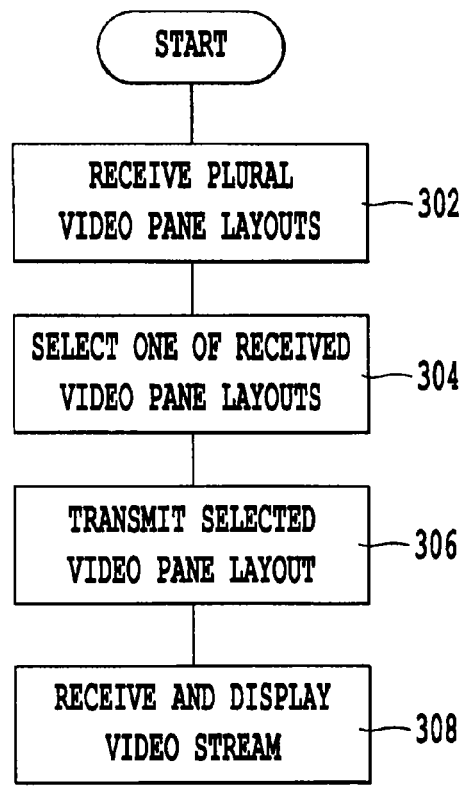
FIG. 3 is a flowchart of another exemplary implementation of a method performed by the receiving device.

FIG. 3 shows an algorithmic flowchart of this exemplary implementation. In step 302, the receiving device receives the layouts offered by the sending device. In this step, the receiving device may also receive the minimum video pane sizes associated with each layout, expressed as a ratio of the overall screen size or as a number of pixels. If the layout choices are dynamic depending upon the number of conference participants, then the sending device may also provide information indicating how the minimum video pane sizes of each layout will change as the conference changes.

Based on the received information, the receiving device selects one of the received video pane layouts in step 304. If the selected layout is subject to change due to changes in the conference, the receiving device can specify, in this step, a minimum video pane size or some other limit on the layout. For instance, a layout option for the active speaker shown in full screen with other conference participants shown small, secondary panes along the bottom of the screen may define that, when up to four secondary participants are present, they will be shown in secondary panes that are 20% of the total height of the stream. However, when five to nine secondary participants are present, the secondary panes will shrink to 10% of the total height of the stream. Given this information, the receiving device could either directly limit the pane size to 20% of the overall height or limit the maximum number of secondary panes to four.

Figure 4:
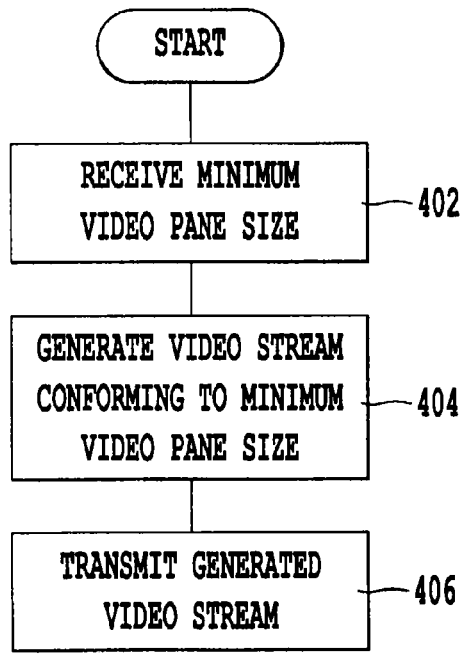
FIG. 4 is a flowchart of an exemplary method performed by a sending terminal.

FIG. 4 depicts an algorithmic flowchart of the operations of the sending device. In step 402, the sending device receives the minimum video pane size from the receiving device. As described above, the received minimum video pane size may include different minimum video pane sizes corresponding to different types of video or to different participants. Also, the received minimum video pane size may be expressed in terms of the physical size of the pane or in a ratio of the pane size to the overall stream size.

As discussed above with respect to FIG. 2, if the sending device does not support the definition of minimum video pane sizes by the receiving device, the sending device may compose a video stream with video panes of arbitrary sizes, effectively ignoring the minimum video pane size defined by the receiving device. Alternatively, based on signaling between the sending and receiving devices, the receiving device may communicate that adherence to the minimum video pane size is mandatory and, if the sending device cannot accommodate definition of the minimum video pane size by the receiving device, the call is aborted.

Assuming the sending device supports definition of the minimum video pane size by the receiving device, the sending device generates a video stream conforming to the minimum video pane size in step 404 and, in step 406 transmits the generated video stream to the receiving device.

Figure 5:
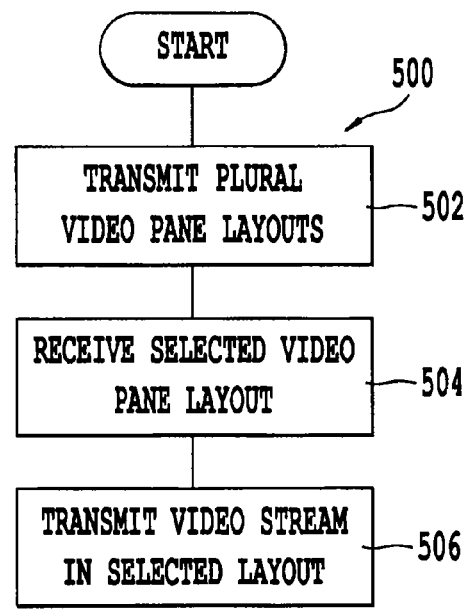
FIG. 5 is a flowchart of another exemplary implementation of the method performed by the sending terminal.

FIG. 5 shows another implementation of the operation of the sending device, corresponding to FIG. 3, which shows the corresponding algorithmic operation of the receiving device. In step 502, the sending device transmits the predefined layout choices to the receiving device. As discussed above with respect to FIG. 3, the sending device may send, together with the layout choices, the minimum video pane sizes for each layout. In step 504, the sending device receives from the receiving devices a selected one of the layout choices. The sending device may also receive additional limits on the selected layout choice, such as a minimum video pane size or maximum number of participants. Finally, in step 506, the sending device may transmit the video stream in the selected layout to the receiving device.

Figure 6:
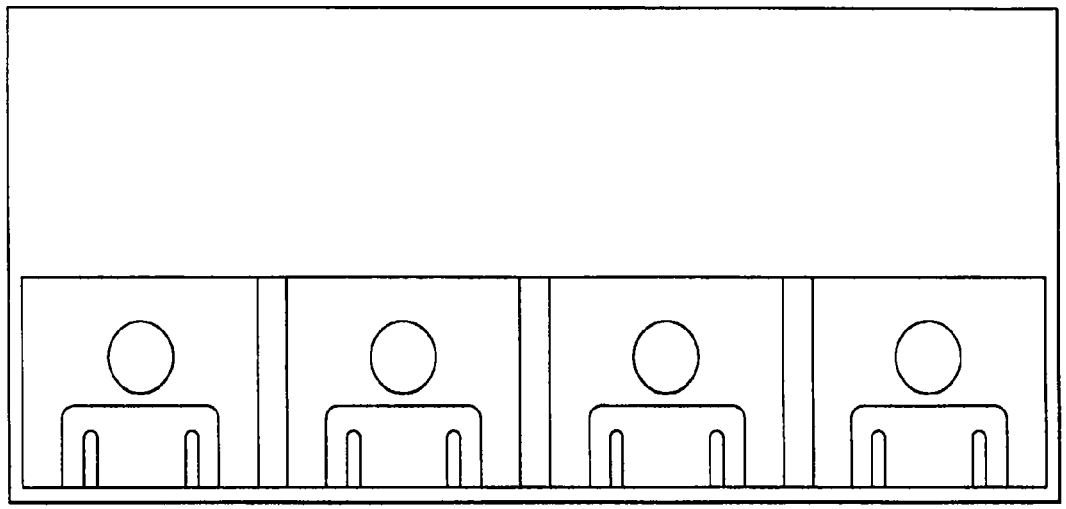
FIG. 6 shows exemplary changes in video pane size based on changes in the number of participants and the screen size.
Figure 6:
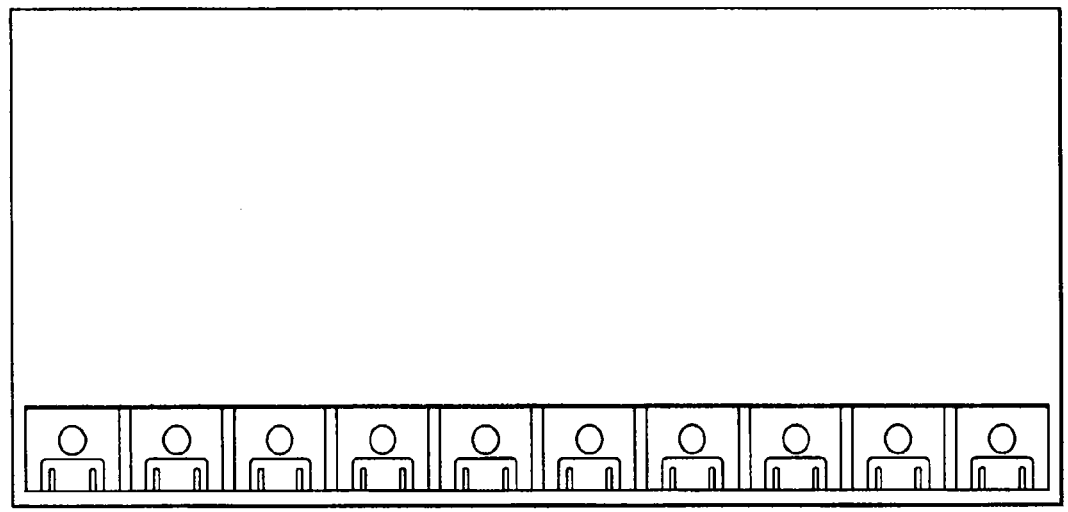
Figure 6:
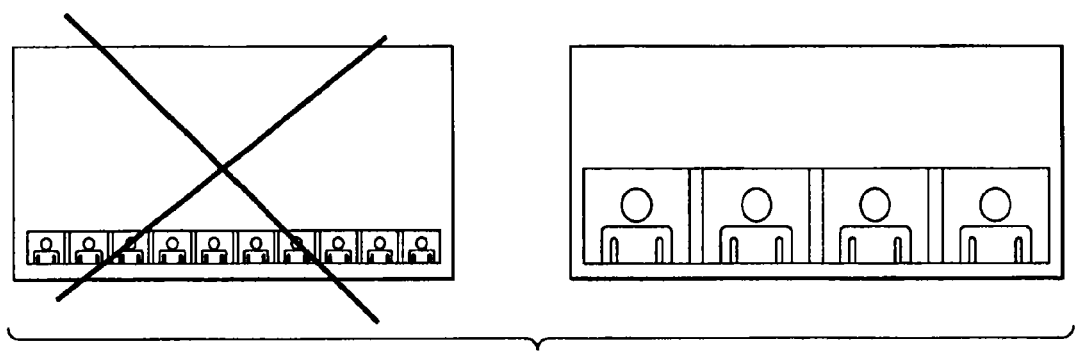

FIG. 6 depicts an exemplary implementation showing changes to video pane size based on changes to the number of conference participants and the screen size of the receiving device. The top screen shows four participants, while the screen below the top screen shows that the size of the video panes showing each participant grows smaller when the number of participants increases to ten. The bottom two screens of FIG. 6 depict an exemplary implementation when the conference with ten participants is displayed on a smaller screen. The bottom left screen shows a scenario in which the video pane of each participant is unacceptably small. The right bottom screen shows an exemplary implementation in which the unacceptably small video pane size of the bottom left screen is below the minimum video pane size of the receiving device, and the receiving device instead receives a layout with fewer panes displayed at a larger pane size.

Figure 7:
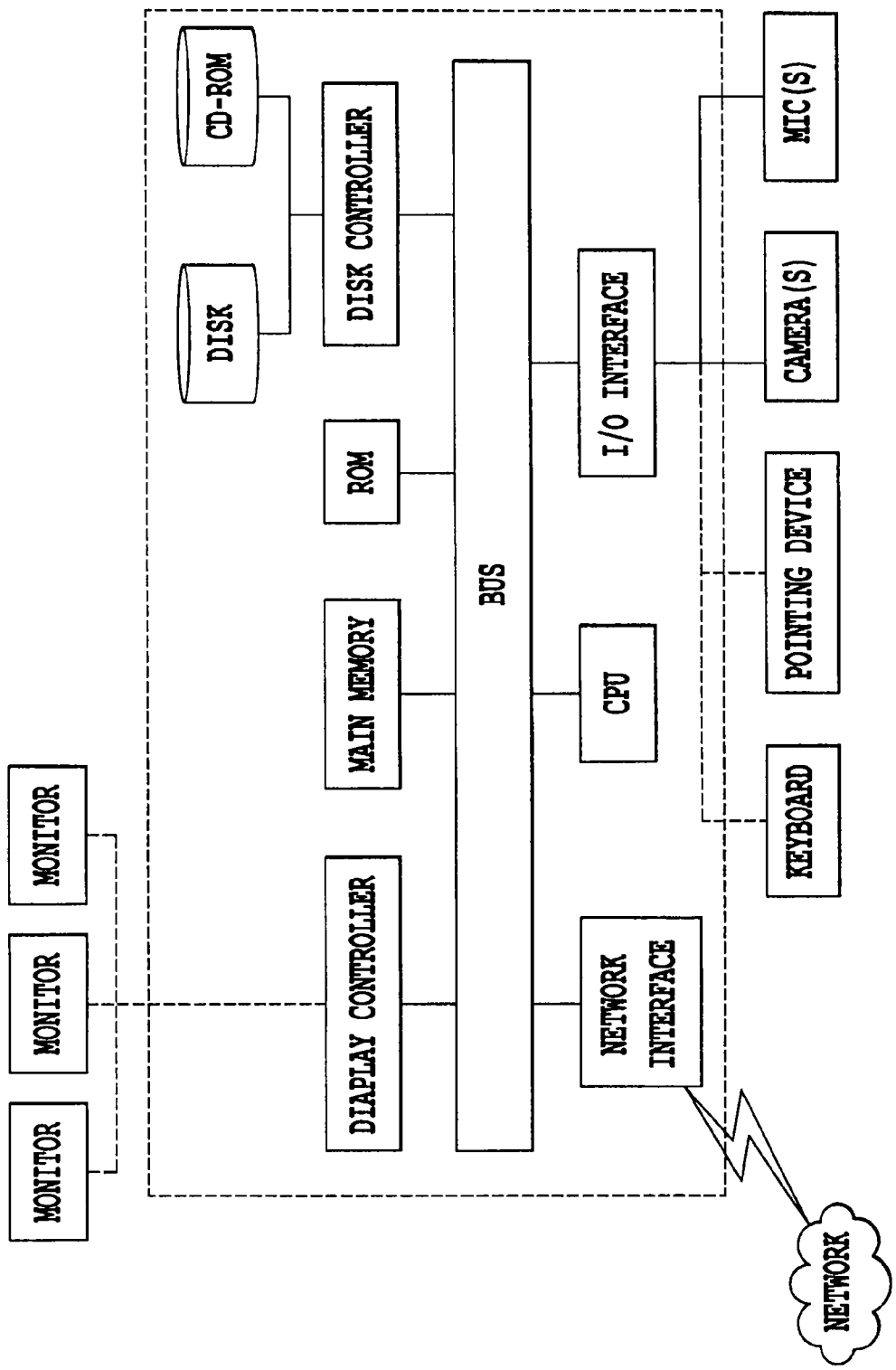
FIG. 7 is a block diagram showing hardware components of an exemplary receiving device and an exemplary sending device.
Figure 8:
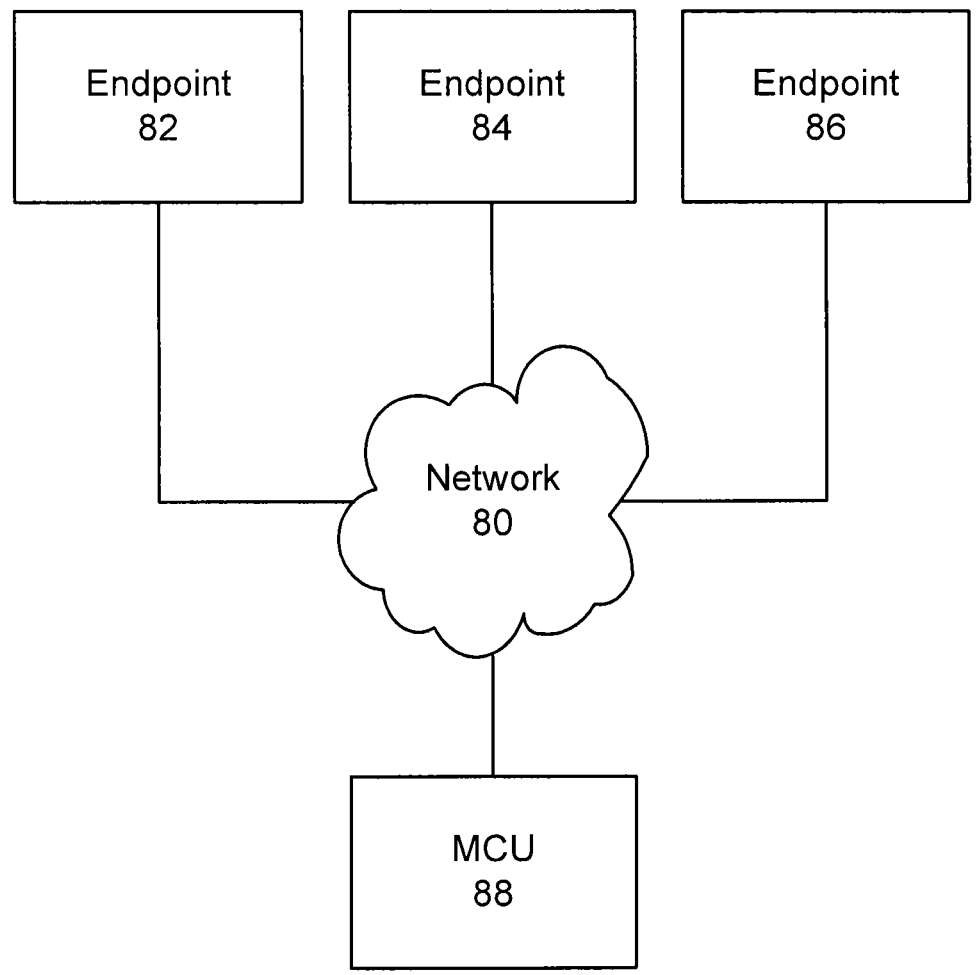
FIG. 8 is a block diagram of a video conferencing system.

FIG. 7 illustrates an exemplary processing system or processor. One or more of such processing systems can be utilized in or to execute one or more algorithms, or portions thereof, or one or more architecture blocks, or portions thereof, in accordance with the descriptions provided herein. One or more of such processing systems can be included in, for example, video conferencing devices such as the sending and receiving devices described herein.

The exemplary processing system can be implemented using one or more microprocessors or the equivalent, such as a central processing unit (CPU) and/or at least one application specific processor ASP. The processor is a circuit that utilizes a computer readable storage medium, such as a memory circuit (e.g., ROM, EPROM, EEPROM, flash memory, static memory, DRAM, SDRAM, and their equivalents), configured to control the processor to perform and/or control the processes and systems of this disclosure. Other storage mediums can be controlled via a controller, such as a disk controller, which can controls a hard disk drive or optical disk drive.

The processor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor can be a separate device or a single processing mechanism. Further, this disclosure can benefit from parallel processing capabilities of a multi-cored CPU. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed, via a display controller, on a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The procedures and routines described herein can be embodied as a system, method or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs and other memory devices.

Reference has been made to flowchart illustrations and block diagrams of methods, systems and computer program products according to implementations of this disclosure.

Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A method comprising:
   determining, at a first video conferencing device, pane sizes of a plurality of video content to be displayed at a second video conferencing device, the pane sizes being determined based on a minimum video pane size corresponding to the second video conferencing device, wherein the minimum video pane size defines a smallest ratio of pane size to a size of a screen on the second video conference device; and
   transmitting, from the first video conferencing device to the second video conferencing device, a video stream including at least a subset of the plurality of video content with the determined pane sizes, the determined pane size being equal to or larger than the minimum video pane size.

2. The method according to claim 1, wherein the minimum video pane size includes different minimum video pane sizes for each of the plurality of video content.

3. The method according to claim 2, wherein the different minimum video pane sizes include a first size for full motion video and a second, larger size for slides including text.

4. The method according to claim 1, wherein the first video conferencing device dynamically changes the pane sizes of the plurality of video content according to changes in a corresponding video conference, the pane sizes remaining at or above the minimum video pane size after the changes.

5. The method according to claim 4, wherein the change in the corresponding video conference includes adding or removing participants.

6. The method according to claim 1, wherein the first video conferencing device removes a subset of the plurality of video content from the video stream when a predetermined maximum number of vide panes corresponding to the second video conferencing device is exceeded.

7. The method according to claim 1, further comprising:
   receiving the minimum video pane size at the first video conferencing device from the second video conferencing device.

8. The method according to claim 1, wherein the first video conferencing device transmits a corresponding minimum video pane size with each video stream.

9. The method according to claim 1, wherein the sets of pane sizes corresponding to video layouts.

10. The method according to claim 9, further comprising:
    transmitting a notification from the first video conferencing device to the plurality of second video conferencing device that the video layouts are changing based on changes in a corresponding video conference.

11. The method according to claim 6, wherein the first video conferencing device receives the minimum video frame size via a call signaling protocol.

12. The method according to claim 11, wherein the call signaling protocol is Session Initiation Protocol (SIP).

13. The method according to claim 1, wherein the minimum video pane size is included in a layout control protocol.

14. A video conferencing device, comprising:
    a processing circuitry configured to determine pane sizes of a plurality of video content to be displayed at a another video conferencing device, the pane sizes being determined based on a minimum video pane size corresponding to the other video conferencing device, wherein the minimum video pane size defines a smallest ratio of pane size to a size of a screen on the another video conferencing device; and
    a communication circuitry configured to transmit, to the other video conferencing device, a video stream including at least a subset of the plurality of video content with the determined pane sizes, the determined pane size being equal to or larger than the minimum video pane size.

15. A non-transitory computer-readable medium encoded with computer-readable instructions thereon, the computer-readable instructions when executed by a video conferencing device, cause the video conferencing device to perform a method comprising: determining pane sizes of a plurality of video content to be displayed at another video conferencing device, the pane sizes being determined based on a minimum video pane size defined by a smallest ratio of pane size to a size of a screen on the another video conferencing device; and
    transmitting, to the other video conferencing device, a video stream including at least a subset of the plurality of video content with the determined pane sizes, the determined pane sizes being equal to or larger than the minimum pane size.

16. The method according to claim 1, wherein the second video conferencing device transmits the minimum video pane size as a declarative Session Description Protocol (SDP).

17. The method according to claim 1, further comprising:
receiving the minimum video pane size associated with each layout at the second video conferencing device from the first video conferencing device.

18. The method of claim 4, wherein the first video conferencing device provides the second video conference device with information detailing how the minimum video pane size will change during the corresponding video conference.

\* \* \* \* \*